(12) United States Patent
Li

(10) Patent No.: US 12,368,492 B2
(45) Date of Patent: Jul. 22, 2025

(54) BEAM SELECTION UNDER MULTIPLE TRANSMISSION POINTS

(71) Applicant: NOKIA TECHNOLOGIES OY, Espoo (FI)

(72) Inventor: Zhihang Li, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 372 days.

(21) Appl. No.: 17/760,153

(22) PCT Filed: Feb. 6, 2020

(86) PCT No.: PCT/CN2020/074424
§ 371 (c)(1),
(2) Date: Aug. 4, 2022

(87) PCT Pub. No.: WO2021/155533
PCT Pub. Date: Aug. 12, 2021

(65) Prior Publication Data
US 2023/0056962 A1 Feb. 23, 2023

(51) Int. Cl.
*H04B 7/0408* (2017.01)
*H04B 7/06* (2006.01)
(Continued)

(52) U.S. Cl.
CPC ......... *H04B 7/0695* (2013.01); *H04B 17/309* (2015.01); *H04B 7/024* (2013.01)

(58) Field of Classification Search
None
See application file for complete search history.

(56) References Cited

U.S. PATENT DOCUMENTS 10,383,050 B2 * 8/2019 Takano ................. H04W 48/20
11,303,329 B2 * 4/2022 Jung ................. H04W 74/0833
(Continued)

FOREIGN PATENT DOCUMENTS

CN 110447280 A 11/2019
CN 110663201 A 1/2020
(Continued)

OTHER PUBLICATIONS

International Search Report and Written Opinion for International Application No. PCT/CN2020/074424, mailed on Nov. 18, 2020, 8 pages.
(Continued)

*Primary Examiner* — Duc T Duong
(74) *Attorney, Agent, or Firm* — Barta Jones, PLLC

(57) ABSTRACT

Embodiments of the present disclosure relate to uplink control information for beam selection in the multiple transmission points. According to embodiments of the present disclosure, a network device determines the beam selection type based on the communication quality required for the network device and a further network device. The network device transmits the information of the beam selection type to a terminal device. The terminal device receives reference signals based on the beam selection type and performs a beam measurement based on the references signals. The terminal device selects a target transmitting beam from a plurality of transmitting beams of the further network device and transmits identities of the selected transmitting beam to the network device or the further network device. In this way, a proper transmitting beam can be selected based on the required communication quality. The latency is shortened and the transmission overhead is reduced.

15 Claims, 8 Drawing Sheets

(51) Int. Cl.
*H04B 17/309* (2015.01)
*H04B 7/024* (2017.01)

(56) References Cited

U.S. PATENT DOCUMENTS

| | | | | |
|---|---|---|---|---|
| 2012/0163510 | A1* | 6/2012 | Cho | H04B 7/086 |
| | | | | 375/316 |
| 2017/0339675 | A1 | 11/2017 | Liu et al. | |
| 2019/0191411 | A1* | 6/2019 | Petersson | H04W 72/02 |
| 2019/0327714 | A1* | 10/2019 | Wang | H04B 7/0695 |
| 2020/0367299 | A1* | 11/2020 | Ryu | H04W 8/005 |
| 2021/0051489 | A1* | 2/2021 | Li | H04W 64/00 |
| 2021/0068077 | A1* | 3/2021 | Raghavan | H04B 7/0404 |
| 2021/0127381 | A1* | 4/2021 | Ryu | H04W 76/14 |
| 2021/0127404 | A1* | 4/2021 | Ryu | H04W 72/1263 |
| 2021/0144524 | A1* | 5/2021 | Byun | H04B 7/0695 |
| 2021/0175957 | A1* | 6/2021 | Raghavan | H04B 7/0452 |
| 2021/0184747 | A1* | 6/2021 | Akkarakaran | H04B 7/0617 |
| 2021/0194551 | A1* | 6/2021 | Raghavan | H04B 7/0665 |
| 2021/0212051 | A1* | 7/2021 | Raghavan | H04W 76/14 |
| 2021/0293917 | A1* | 9/2021 | Yuan | H04L 5/0048 |
| 2022/0038165 | A1* | 2/2022 | Li | H04B 7/0639 |
| 2022/0141676 | A1* | 5/2022 | Wang | H04W 72/02 |
| | | | | 370/329 |
| 2022/0200687 | A1* | 6/2022 | Guo | H04L 27/2613 |
| 2022/0303795 | A1* | 9/2022 | Bala | H04W 24/08 |
| 2022/0345191 | A1* | 10/2022 | Guo | H04B 7/0686 |

FOREIGN PATENT DOCUMENTS

| | | |
|---|---|---|
| WO | 2017101040 A1 | 6/2017 |
| WO | 2018028307 A1 | 2/2018 |
| WO | 2018030845 A1 | 2/2018 |

OTHER PUBLICATIONS

3GPP TSG RAN WG1 Meeting #95; R1-1812324; "Discussion on Enhancements on Multi-Beam Operation"; Source: vivo; Agenda Item: 7.2.8.3; Nov. 12-16, 2018; 10 pages.

3GPP TSG RAN Meeting #86; RP-192435; "Summary of email Discussion for Rel.17 Enhancements on MIMO for NR"; Source: Samsung; Agenda Item: 9.1.1; Dec. 9-12, 2019; 31 pages.

Office Action and Search Report for Chinese Application No. 202080095640.9, mailed on Jun. 1, 2023, 8 pages.

* cited by examiner

BEAM SELECTION UNDER MULTIPLE TRANSMISSION POINTS

CROSS-REFERENCE TO RELATED APPLICATIONS

This application is a national stage entry of International Application No. PCT/CN2020/074424, filed Feb. 6, 2020, entitled "BEAM SELECTION UNDER MULTIPLE TRANSMISSION POINTS" which is hereby incorporated by reference in its entirety.

FIELD

Embodiments of the present disclosure generally relate to communication techniques, and more particularly, to methods, devices and computer readable medium for beam selection under multiple transmission points.

BACKGROUND

In order to accommodate the increasing number of user equipment (UE) and provide variety of applications, new radio (NR) system adopts larger bandwidth and higher frequency band than long term evolution advanced (LTE-A) system. However, coverage and throughput of NR system may not be guaranteed with omnidirectional antennas due to hostile propagation qualities, including large pathloss, atmospheric and rain absorptions, low diffraction around obstacles and penetration through objects on high frequency band. Therefore, NR system uses directional antennas and big antenna arrays to produce narrow beams with high beamforming gains. Generating one analogue beam of a network node (either a next generation Node B (gNB) or a UE) in a time duration and sweeping all beams during several time durations with a time division multiplexing manner, NR can provide seamless access to UEs located at anywhere in a gNB.

SUMMARY

Generally, embodiments of the present disclosure relate to a method for beam selection under multiple transmission points and corresponding devices.

In a first aspect, there is provided a first device. The first device comprises at least one processor; and at least one memory including computer program codes; the at least one memory and the computer program codes are configured to, with the at least one processor, cause the first device to receive, from a second device, information indicating a beam selection type for the second device and a third device, the beam selection type associated with communication quality required for the second device and the third device. The first device is also caused to receiving a plurality of reference signals from a plurality of transmitting beams of the third device based on the beam selection type. The first device is further caused to perform a beam measurement at least in part based on the plurality of reference signals. The first device is yet caused to select a transmitting beam of the third device based on the beam measurement. The first device is also caused to transmit identity information to at least one of the second and third devices, the identify information at least indicating the selected transmitting beam.

In a second aspect, there is provided a second device. The second device comprises at least one processor; and at least one memory including computer program codes; the at least one memory and the computer program codes are configured to, with the at least one processor, cause the second device to determine a beam selection type for the second device and a third device based on communication quality required for the second device and the third device. The second device is also caused to transmit information of the beam selection type to a first device. The second device is further caused to transmit indication of selection of transmitting beam to the third device. The second device is yet caused to receive, from the first device or the third device, identity information at least indicating a selected transmitting beam of the third device.

In a third aspect, there is provided a third device. The third device comprises at least one processor; and at least one memory including computer program codes; the at least one memory and the computer program codes are configured to, with the at least one processor, cause the third device to receive, from a second device, indication of selection of transmitting beam. The third device is also caused to transmit a plurality of signals with a plurality of transmitting beams. The third device is further caused to receive, from the first device or the second device, identity information at least indicating a selected transmitting beam of the third device.

In a fourth aspect, there is provided a method. The method comprises receiving, at a first device and from a second device, information indicating a beam selection type for the second device and a third device, the beam selection type associated with communication quality required for the second device and the third device. The method also comprises receiving a plurality of reference signals from a plurality of transmitting beams of the third device based on the beam selection type. The method further comprises performing a beam measurement at least in part based on the plurality of reference signals. The method also comprises selecting a transmitting beam of the third device based on the beam measurement. The method yet comprises transmitting identity information to at least one of the second and third devices, the identify information at least indicating the selected transmitting beam.

In a fifth aspect, there is provided a method. The method comprises determining, at a second device, a beam selection type for the second device and a third device based on communication quality required for the second device and the third device. The method also comprises transmitting information of the beam selection type to a first device. The method further comprises transmitting indication of selection of transmitting beam to the third device. The method yet comprises receiving, from the first device or the third device, identity information at least indicating a selected transmitting beam of the third device.

In a sixth aspect, there is provided a method. The method comprises receiving, at a third device and from a second device, indication of selection of transmitting beam. The method also comprises transmitting a plurality of signals with a plurality of transmitting beams. The method further comprises receiving, from the first device or the second device, identity information at least indicating a selected transmitting beam of the third device.

In a seventh aspect, there is provided an apparatus. The apparatus comprises means for receiving, at a first device and from a second device, information indicating a beam selection type for the second device and a third device, the beam selection type associated with communication quality required for the second device and the third device; means for receiving a plurality of reference signals from a plurality of transmitting beams of the third device based on the beam selection type; means for performing a beam measurement at least in part based on the plurality of reference signals; mans for selecting a transmitting beam of the third device based on the beam measurement; and means for transmitting identity information to at least one of the second and third devices, the identify information at least indicating the selected transmitting beam.

In an eighth aspect, there is provided an apparatus. The apparatus comprises means for determining, at a second device, a beam selection type for the second device and a third device based on communication quality required for the second device and the third device; means for transmitting information of the beam selection type to a first device; means for transmitting indication of selection of transmitting beam to the third device; and means for receiving, from the first device or the third device, identity information at least indicating a selected transmitting beam of the third device.

In a ninth aspect, there is provided an apparatus. The apparatus comprises means for receiving, at a third device and from a second device, indication of selection of transmitting beam; means for transmitting a plurality of signals with a plurality of transmitting beams; and means for receiving, from the first device or the second device, identity information at least indicating a selected transmitting beam of the third device.

In a tenth aspect, there is provided a computer readable medium comprising program instructions for causing an apparatus to perform at least the method according to the above fourth, fifth or sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
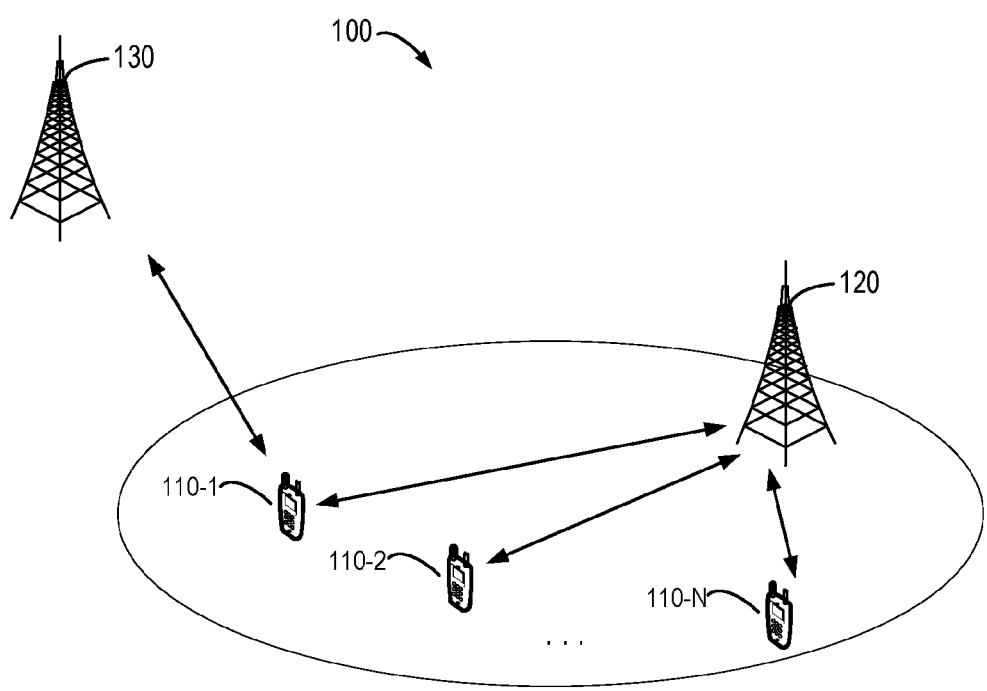
FIG. 1 illustrates a schematic diagram of a communication system according to according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT).

The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Besides single transmission point (STRP) mode, multi transmission point (MTRP) mode is utilized to enhance receiving signal power or provide more transmission data streams, which can improve system performances. However, the third partner project (3GPP) release 16 (R16) only defines the beam selection signaling (BSS) under STRP scenario, which can't be adopted directly under MTRP scenario.

According to conventional BSS procedure under STRP scenario of R16, it has four steps. Firstly, gNB transmits DL RS (e.g. CSI-RS/SS) with Tx beam sweeping. Then UE measures the beam quality (e.g. L1-RSRP) with Rx beam sweeping and selects the beam pair link with the largest beam quality. Thirdly, UE transmits UL RS (e.g. PUCCH/PUSCH) to gNB with the selected gNB Tx beam ID and the corresponding beam quality. Lastly, gNB transmits DL RS (e.g. PDDCH) to confirm the beam selection result to UE.

After performing BSS of PST, UE begins to measure beam quality of secondary serving TRP (SST) under MTRP scenario. However, whether to use the same UE Rx beam as that of BSS of PST, or to use UE Rx beam sweeping to measure all paired Tx beams of PST/SST is ambiguous to UE. What's more, the two different beam measurement behavior will also affect the signaling overhead of UE CSI feedback step.

According to embodiments of the present disclosure, a network device determines the beam selection type based on the communication quality required for the network device and a further network device. The network device transmits the information of the beam selection type to a terminal device. The terminal device receives reference signals based on the beam selection type and performs a beam measurement based on the references signals. The terminal device selects a target transmitting beam from a plurality of transmitting beams of the further network device and transmits identities of the selected transmitting beam to the network device or the further network device. In this way, a proper transmitting beam can be selected based on the required communication quality. The latency is shortened and the transmission overhead is reduced.

FIG. 1 illustrates a schematic diagram of a communication system in which embodiments of the present disclosure can be implemented. The communication system 100, which is a part of a communication network, comprises a device 110-1, a device 110-2, . . . , a device 110-N, which can be collectively referred to as "first device(s) 110." The communication system 100 further comprises a second device 120 and a third device 130. One or more devices are associated with and covered by a cell. It is to be understood that the number of devices and cells shown in FIG. 1 is given for the purpose of illustration without suggesting any limitations. The communication system 100 may comprise any suitable number of devices and cells. In the communication system 100, the first device 110, the second device 120 and the third device 130 can communicate data and control information to each other. In the case that the first device 110 is the terminal device and the second device 120 and third device 130 are the network devices, a link from the second device 120 or the third device 130 to the first device 110 is referred to as a downlink (DL), while a link from the first device 110 to the second device 120 or the third device 130 is referred to as an uplink (UL). The number of devices shown in FIG. 1 is given for the purpose of illustration without suggesting any limitations. The second device 120 and the third device 130 are interchangeable.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple Access (OFDMA) and/or any other technologies currently known or to be developed in the future.

Figure 2:
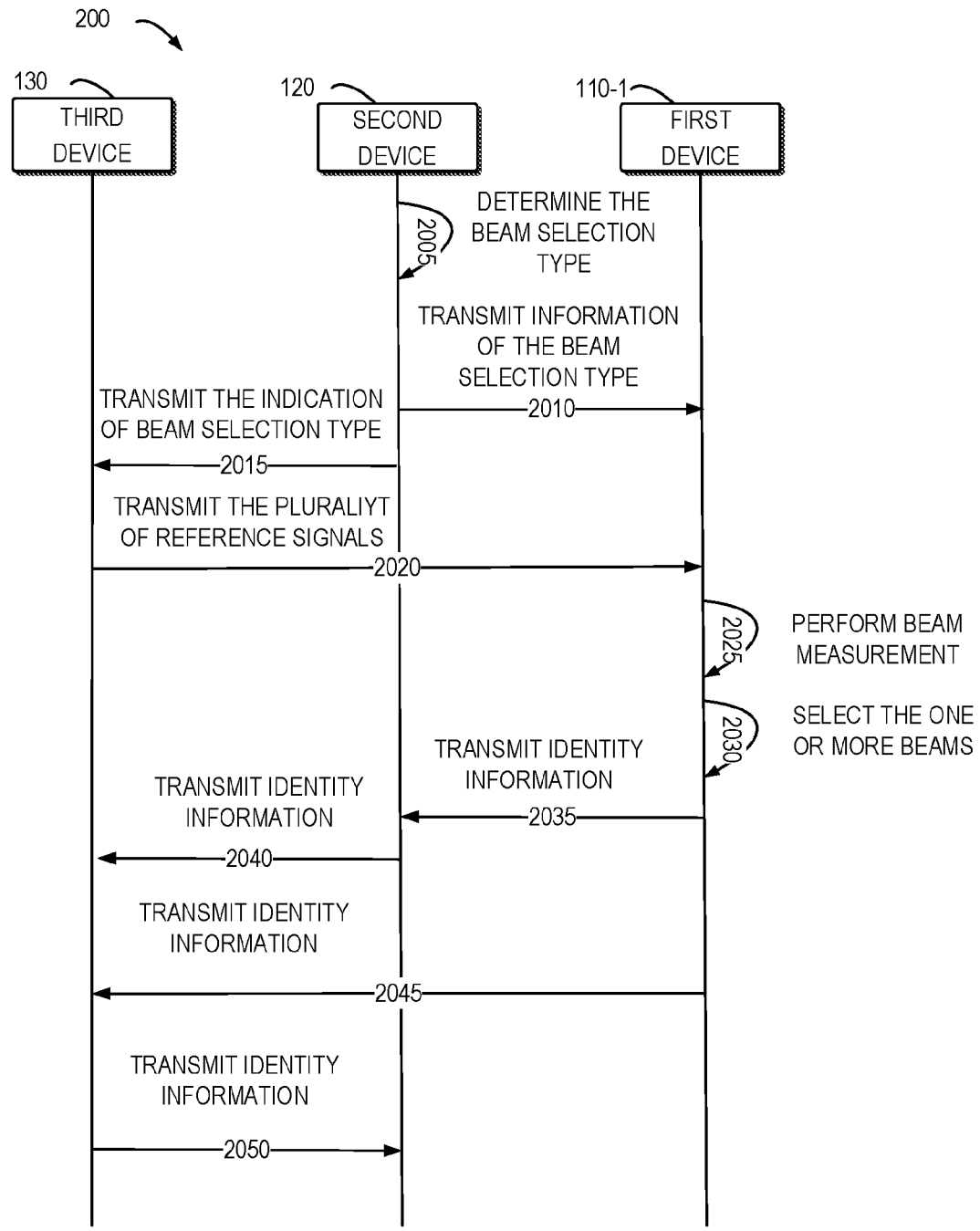
FIG. 2 illustrates a schematic diagram of interactions between devices according to according to some embodiments of the present disclosure.

FIG. 2 illustrates a schematic diagram of interactions 200 among devices in accordance with some embodiments of the present disclosure. The interactions 200 may be implemented at any suitable devices. Only for the purpose of illustrations, the interactions 200 are described to be implemented at the first device 110-1, the second device 120 and the third device 130.

The second device 120 determines 2005 the beam selection type based on the communication quality required for the second device 120 and the third device 130. Only as an example, if the communication quality indicates a low latency, the beam selection type may indicate that the latency is below a threshold latency. Alternatively or in addition, if the communication quality indicates a high performance, the beam selection type may indicate that the performance exceeds a threshold performance. Only for the purpose of illustrations, the interactions 200 is described with the reference to the low latency type. The beam selection type may indicate how the first device 110-1 adopt beam measurement and feedback the measurement results.

The second device 120 transmits 2010 information of the beam selection type to the first device 110-1. For example, the information of the beam selection type may be transmitted in downlink control information. Alternatively or in addition, the information of the beam selection type may be transmitted in radio resource control (RRC) signaling. In other embodiments, the information of the beam selection type may be transmitted medium access control (MAC) control element (CE). In some embodiments, the information of the beam selection type may be transmitted in downlink (DL) reference signal (RS), for example, physical downlink control channel (PDCCH).

The second device 120 transmits 2015 an indication of selection of transmitting beam to the third device 130 via backhaul. For example, the indication of the beam selectin may be transmitted via a X2 interface. After receiving the indication of beam selection type, the second device 120 may prepare for multi transmission points (MTRP).

The third device 130 transmits 2020 a plurality of reference signals to the first device with a plurality of transmitting beams. In other words, the third device 130 may transmit the plurality of reference signals with transmitting beam sweeping. In some embodiments, the reference signal may be channel state information reference signal (CSI-RS). Alternatively or in addition, the reference signal may be CSI synchronization signal (CSI-SS).

The first device 110-1 performs 2025 the beam measurement at least in part based on the plurality of reference signals. For example, the first device 110-1 may measure received signal power of the plurality of reference signals. In low latency type, the first device 110-1 may measure the beam quality of the plurality of transmitting beams with the same receiving beam selected in beam selection of the second device 120. For example, if the first device 110-1 selects receiving beam #1 to receive signals from the second device 120, the first device 110-1 may still measure the beam quality with the same receiving beam #1. Only as an example, assuming the second device 120 has A transmitting beams, the third device 130 has B transmitting beams, the first device 110-1 has C receiving beams, in this situation, the first device 110-1 can measure only one Tx beam with one Rx beam in each transmission time interval (TTI). That is to say, the beam measurement only needs B TTI, which reduce the latency.

The first device 110-1 selects 2030 at least one transmitting beam of the third device 130. For example, the first device 110-1 may compare the beam quality of the plurality of transmitting beams with a threshold beam quality. If the beam quality of a transmitting beam exceeds the threshold beam quality, the first device 110-1 may the transmitting beam. In some embodiments, the first device 110-1 may select one or more beam pairs each of which comprises one transmitting beam of the third device 130 and one receiving beam of the first device 110-1.

In some embodiments, the first device 110-1 transmits 2035 the identity information of the selected transmitting beam of the third device 130 to the second device 120. The identity information may also comprise a corresponding beam quality (for example, reference signal received power RSRP). The identity information may be transmitted with uplink reference signal. For example, the identity information may be transmitted in physical uplink control channel (PUCCH). Alternatively or in addition, the identity information may be transmitted in physical uplink shared channel (PUSCH). The second device 120 may transmit 2040 the identity information of the selected transmitting beam of the third device 130 to the third device 130 via the backhaul.

Alternatively or in addition, the first device 110-1 transmits 2045 the identity information of the selected transmitting beam of the third device 130 to the third device 120. The identity information may also comprise a corresponding beam quality (for example, RSRP). The identity information may be transmitted with uplink reference signal. For example, the identity information may be transmitted in PUCCH. Alternatively or in addition, the identity information may be transmitted in PUSCH. The third device 130 may transmit 2050 the identity information of the selected transmitting beam of the third device 130 to the second device 120 via the backhaul. The first device 110-1, the second device 120 and the third device 130 may update their beam status and prepare for the upcoming transmission.

Figure 3:
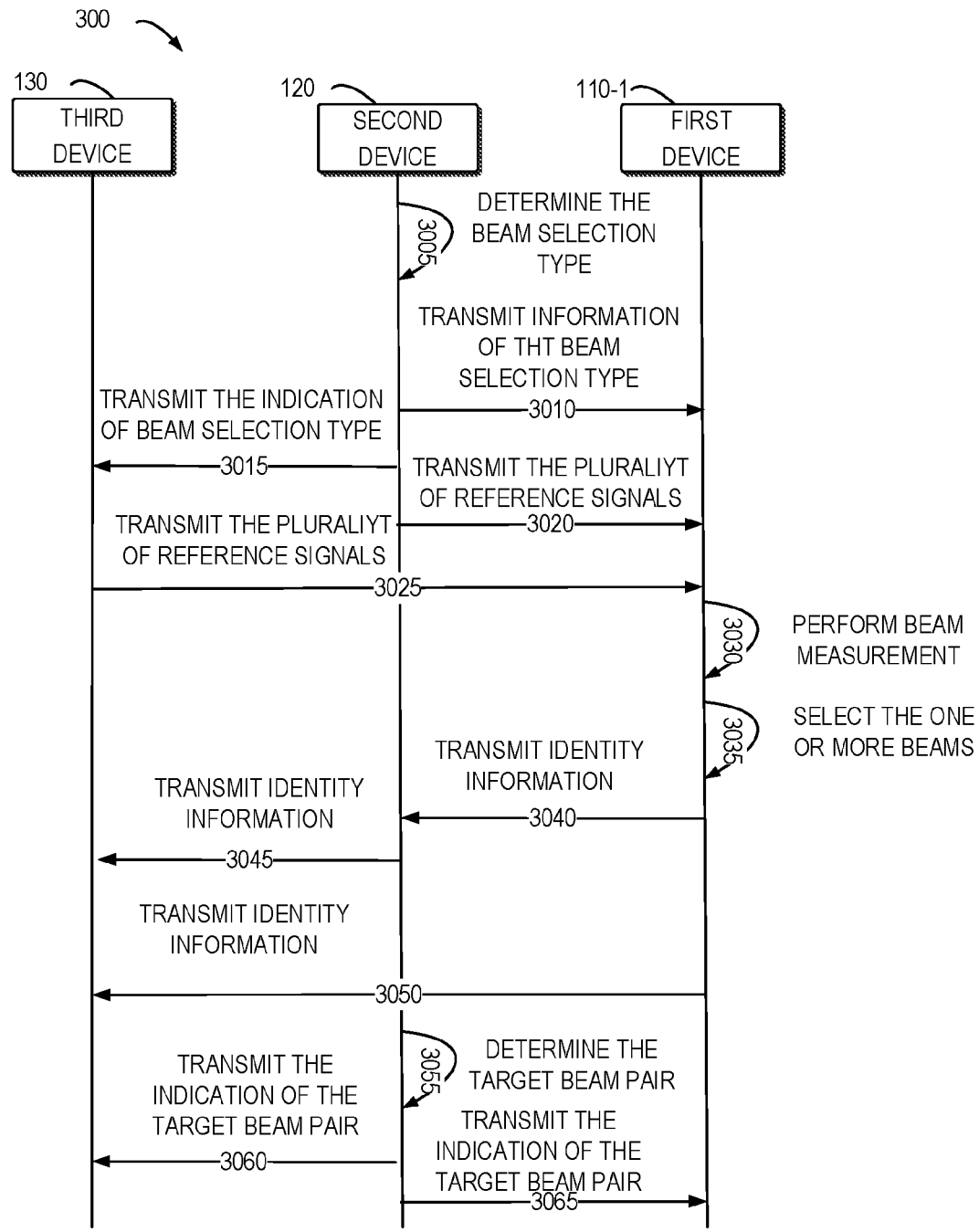
FIG. 3 illustrates a schematic diagram of interactions between devices according to according to some embodiments of the present disclosure.

FIG. 3 illustrates a schematic diagram of interactions 300 among devices in accordance with some embodiments of the present disclosure. The interactions 300 may be implemented at any suitable devices. Only for the purpose of illustrations, the interactions 300 are described to be implemented at the first device 110-1, the second device 120 and the third device 130.

The second device 120 determines 3005 the beam selection type based on the communication quality required for the second device 120 and the third device 130. Only as an example, if the communication quality indicates a low latency, the beam selection type may indicate that the latency is below a threshold latency. Alternatively or in addition, if the communication quality indicates a high performance, the beam selection type may indicate that the performance exceeds a threshold performance. Only for the purpose of illustrations, the interactions 300 is described with the reference to the high performance type. The beam selection type may indicate how the first device 110-1 adopt beam measurement and feedback the measurement results.

The second device 120 transmits 3010 information of the beam selection type to the first device 110-1. For example, the information of the beam selection type may be transmitted in downlink control information. Alternatively or in addition, the information of the beam selection type may be transmitted in RRC signaling. In other embodiments, the information of the beam selection type may be transmitted MAC CE. In some embodiments, the information of the beam selection type may be transmitted in DL RS, for example, PDCCH.

The second device 120 transmits 3015 an indication of selection of transmitting beam to the third device 130 via backhaul. For example, the indication of the beam selectin may be transmitted via a X2 interface. After receiving the indication of beam selection type, the second device 120 may prepare for MTRP.

The second device 120 transmits 3020 a plurality of reference signals to the first device with a plurality of transmitting beams. In other words, the second device 120 may transmit the plurality of reference signals with transmitting beam sweeping. In some embodiments, the reference signal may be CSI-RS. Alternatively or in addition, the reference signal may be CSI-SS.

The third device 130 transmits 3025 a further plurality of reference signals to the first device with a plurality of transmitting beams. In other words, the third device 130 may transmit the plurality of reference signals with transmitting beam sweeping. In some embodiments, the reference signal may be CSI-RS. Alternatively or in addition, the reference signal may be CSI-SS.

The first device 110-1 performs 3030 the beam measurement at least in part based on the plurality of reference signals from the second device 120 and the further plurality of reference signals from the third device 130. For example, the first device 110-1 may measure received signal power of the plurality of reference signals. In the high performance type, the first device 110-1 may measure the beam quality with a plurality of receiving beams. In other words, the first device 110-1 may perform the beam measurement with receiving beam sweeping. For the purpose of illustrations, assuming the second device 120 has A Tx beams, the third device 130 has B Tx beams, the first device 110-1 has C Rx beams, the beam measurement needs A*B*C TTI.

The first device 110-1 selects 3035 a transmitting beam of the second device 120 and a further transmitting beam of the third device 130. For example, the first device 110-1 may compare the beam quality of the plurality of transmitting beams of the second device 120 with a threshold beam quality. If the beam quality of a transmitting beam exceeds the threshold beam quality, the first device 110-1 may the transmitting beam. The first device 110-1 may compare the beam quality of the further plurality of transmitting beams of the third device 130 with the threshold beam quality. If the beam quality of a further transmitting beam exceeds the threshold beam quality, the first device 110-1 may the further transmitting beam. In some embodiments, the first device 110-1 may select one or more beam pairs each of which comprises one transmitting beam of the third device 130, one transmitting beam of the second device 120 and one receiving beam of the first device 110-1. Since the first device 110-1 performs full dimension measurement, the selected beam pair has the best beam quality.

In some embodiments, the first device 110-1 transmits 3040 the identity information of the selected transmitting beam of the third device 130 to the second device 120. The identity information may also comprise a corresponding beam quality (for example, reference signal received power RSRP). The identity information may be transmitted with uplink reference signal. For example, the identity information may be transmitted in PUCCH. Alternatively or in addition, the identity information may be transmitted in PUSCH. The second device 120 may transmit 3045 the identity information of the selected transmitting beam of the third device 130 to the third device 130 via the backhaul.

Alternatively or in addition, the first device 110-1 transmits 3050 the identity information of the selected transmitting beam of the third device 130 to the third device 120. The identity information may also comprise a corresponding beam quality (for example, RSRP). The identity information may be transmitted with uplink reference signal. For example, the identity information may be transmitted in PUCCH. Alternatively or in addition, the identity information may be transmitted in PUSCH. In some embodiments, the third device 130 may transmit the identity information of the selected transmitting beam of the third device 130 to the second device 120 via the backhaul.

In some embodiments, if the first device 110-1 transmit more than one beam pair, for example a first beam pair and a second beam pair, the second device 120 may determine 3055 a target beam pair from the more than one beam pair. The second device 120 may transmit 3060 the indication of the target beam pair to the third device 130. The second device 120 may also transmit 3065 the indication of the target beam pair to the first device 110-1.

Alternatively, the second device 120 or the third device 130 may transmit the identity information to a core network device (not shown), the core network device may determine a target beam pair from the more than one beam pair. The core network device may transmit the indication of the target beam pair to the second device 120 and the third device 130. The first device 110-1, the second device 120 and the third device 130 may update their beam status and prepare for the upcoming transmission.

It should be noted that the beam selection types are not limited to low latency or high performance. There are other suitable beam selection types which satisfy different communication qualities. Aspects of this disclosure are not limited to this aspect.

Figure 4:
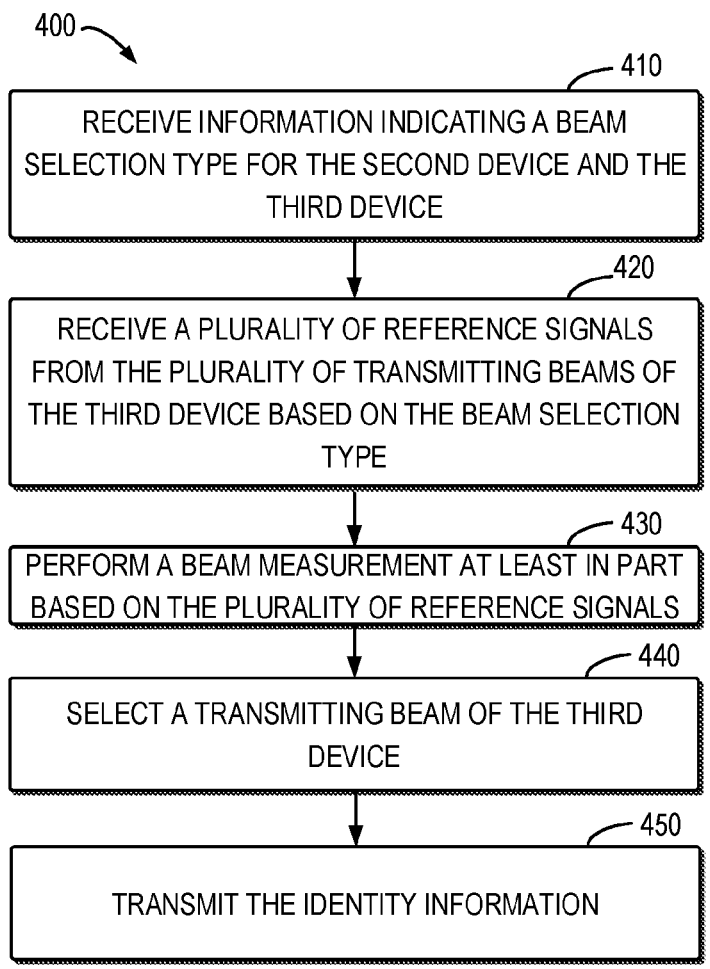
FIG. 4 illustrates a flow chart of a method according to embodiments of the present disclosure.

FIG. 4 illustrates a flow chart of method 400 according to embodiments of the present disclosure. The method 400 can be implemented at any suitable devices. For example, the method may be implemented at the first device 110-1.

At block 410, the first device 110-1 receives the information of the beam selection type from the second device 120. For example, the information of the beam selection type may be transmitted in downlink control information. Alternatively or in addition, the information of the beam selection type may be transmitted in RRC signaling. In other embodiments, the information of the beam selection type may be transmitted MAC CE. In some embodiments, the information of the beam selection type may be transmitted in DL RS, for example, PDCCH. The beam selection type may be determined based on the communication quality required for the second device 120 and the third device 130.

At block 420, the first device 110-1 receives a plurality of reference signals from a plurality of transmitting beams of the third device 130 based on the beam selection type. For example, if the beam selection type indicates a low latency type, the first device 110-1 may only receive the plurality of reference signals from the plurality of transmitting beams of the third device 130. Alternatively or in addition, if the beam selection type indicates a high performance type, the first device 110-1 may also receive a further plurality of reference signals from a further plurality of transmitting beams of the second device 120.

At block 430, the first device 110-1 performs the beam measurement at least in part based on the plurality of reference signals. For example, the first device 110-1 may measure received signal power of the plurality of reference signals. In low latency type, the first device 110-1 may measure the beam quality of the plurality of transmitting beams with the same receiving beam selected in beam selection of the second device 120. For example, if the first device 110-1 selects receiving beam #1 to receive signals from the second device 120, the first device 110-1 may still measure the beam quality with the same receiving beam #1. Only as an example, assuming the second device 120 has A transmitting beams, the third device 130 has B transmitting beams, the first device 110-1 has C receiving beams, in this situation, the first device 110-1 can measure only one Tx beam with one Rx beam in each TTI. That is to say, the beam measurement only needs B TTI, which reduce the latency.

In the high performance type, the first device 110-1 may measure the beam quality with a plurality of receiving beams. In other words, the first device 110-1 may perform the beam measurement with receiving beam sweeping. For the purpose of illustrations, assuming the second device 120 has A Tx beams, the third device 130 has B Tx beams, the first device 110-1 has C Rx beams, the beam measurement needs A*B*C TTI.

At block 440, the first device 110-1 selects at least one transmitting beam of the third device 130. In some embodiments, the first device 110-1 may compare the beam quality of the plurality of transmitting beams with a threshold beam quality. If the beam quality of a transmitting beam exceeds the threshold beam quality, the first device 110-1 may the transmitting beam. In some embodiments, the first device 110-1 may select one or more beam pairs each of which comprises one transmitting beam of the third device 130 and one receiving beam of the first device 110-1.

In some embodiments, the first device 110-1 may compare the beam quality of the plurality of transmitting beams of the second device 120 with a threshold beam quality. If the beam quality of a transmitting beam exceeds the threshold beam quality, the first device 110-1 may the transmitting beam. The first device 110-1 may compare the beam quality of the further plurality of transmitting beams of the third device 130 with the threshold beam quality. If the beam quality of a further transmitting beam exceeds the threshold beam quality, the first device 110-1 may the further transmitting beam. In some embodiments, the first device 110-1 may select one or more beam pairs each of which comprises one transmitting beam of the third device 130, one transmitting beam of the second device 120 and one receiving beam of the first device 110-1. Since the first device 110-1 performs full dimension measurement, the selected beam pair has the best beam quality.

At block 450, the first device 110-1 transmits the identity information of the selected transmitting beam of the third device 130 to at least one of the second device 120 or the third device 130. The identity information may also comprise a corresponding beam quality (for example, reference signal received power RSRP). The identity information may be transmitted with uplink reference signal. For example, the identity information may be transmitted in PUCCH. Alternatively or in addition, the identity information may be transmitted in PUSCH.

Figure 5:
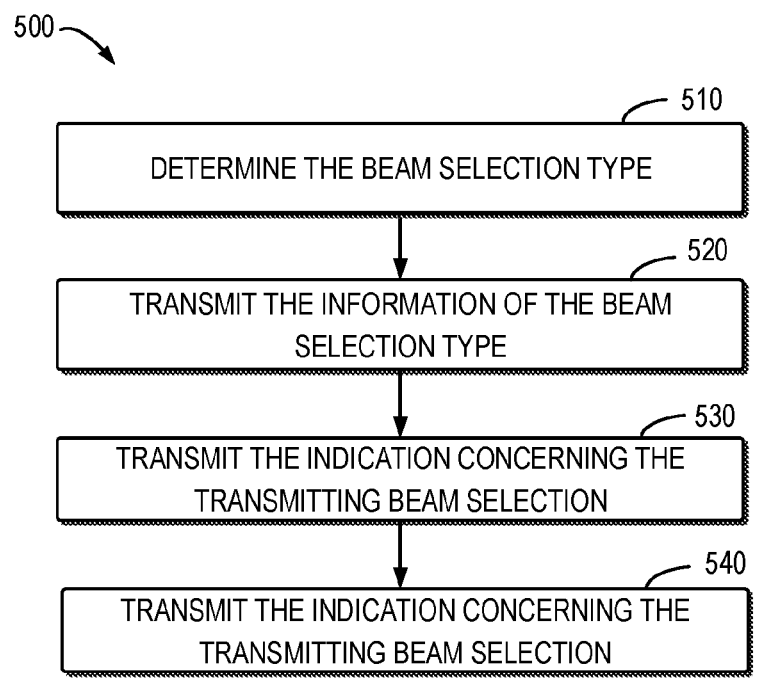
FIG. 5 illustrates a flow chart of a method according to embodiments of the present disclosure.

FIG. 5 illustrates a flow chart of method 500 according to embodiments of the present disclosure. The method 500 can be implemented at any suitable devices. For example, the method may be implemented at the second device 120.

At block 510, the second device 120 determines the beam selection type based on the communication quality required for the second device 120 and the third device 130. Only as an example, if the communication quality indicates a low latency, the beam selection type may indicate that the latency is below a threshold latency. Alternatively or in addition, if the communication quality indicates a high performance, the beam selection type may indicate that the performance exceeds a threshold performance. Only for the purpose of illustrations, the interactions 200 is described with the reference to the low latency type. The beam selection type may indicate how the first device 110-1 adopt beam measurement and feedback the measurement results.

At block 520, the second device 120 transmits information of the beam selection type to the first device 110-1. For example, the information of the beam selection type may be transmitted in downlink control information. Alternatively or in addition, the information of the beam selection type may be transmitted in RRC signaling. In other embodiments, the information of the beam selection type may be transmitted MAC CE. In some embodiments, the information of the beam selection type may be transmitted in DL RS, for example, PDCCH.

In some embodiments, the second device 120 may transmit a plurality of reference signals to the first device with a plurality of transmitting beams. In other words, the second device 120 may transmit the plurality of reference signals with transmitting beam sweeping. In some embodiments, the reference signal may be CSI-RS. Alternatively or in addition, the reference signal may be CSI-SS.

At block 530, the second device 120 transmits an indication of selection of transmitting beam to the third device 130 via backhaul. For example, the indication of the beam selectin may be transmitted via a X2 interface. After receiving the indication of beam selection type, the second device 120 may prepare for MTRP.

At block 540, the second device 120 receives the identity information of the selected transmitting beam of the third device 130 from the first device 110-1 or the third device 130. The identity information may also comprise a corresponding beam quality (for example, reference signal received power RSRP). The identity information may be transmitted with uplink reference signal. For example, the identity information may be transmitted in PUCCH. Alternatively or in addition, the identity information may be transmitted in PUSCH. In some embodiments, the second device 120 may transmit the identity information of the selected transmitting beam of the third device 130 to the third device 130 via the backhaul.

In some embodiments, if the first device 110-1 transmit more than one beam pair, for example a first beam pair and a second beam pair, the second device 120 may determine a target beam pair from the more than one beam pair. The second device 120 may transmit the indication of the target beam pair to the third device 130. The second device 120 may also transmit the indication of the target beam pair to the first device 110-1.

Alternatively, the second device 120 or the third device 130 may transmit the identity information to a core network device (not shown), the core network device may determine a target beam pair from the more than one beam pair. The core network device may transmit the indication of the target beam pair to the second device 120 and the third device 130. The first device 110-1, the second device 120 and the third device 130 may update their beam status and prepare for the upcoming transmission.

Figure 6:
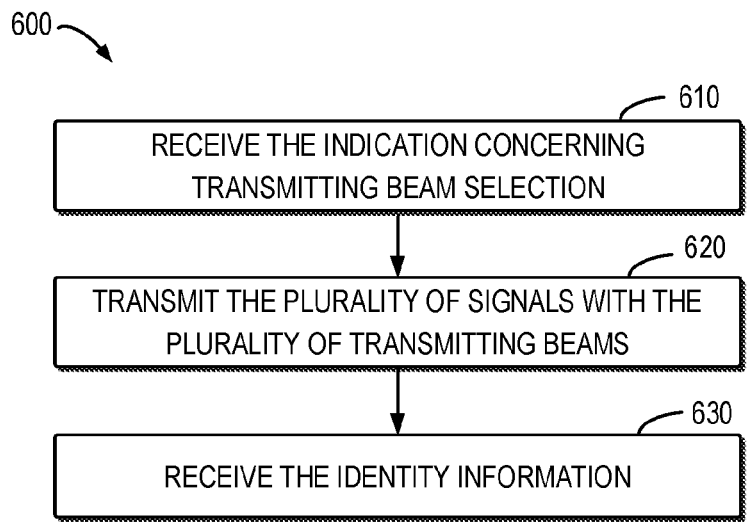
FIG. 6 illustrates a flow chart of a method according to embodiments of the present disclosure.

FIG. 6 illustrates a flow chart of method 600. The method 600 can be implemented at any suitable devices. For example, the method may be implemented at the network device 120.

At block 610, the third device 130 receives an indication of selection of transmitting beam from the second device 120 via backhaul. For example, the indication of the beam selectin may be transmitted via a X2 interface. After receiving the indication of beam selection type, the second device 120 may prepare for MTRP.

At block 620, the third device 130 transmits a further plurality of reference signals to the first device with a plurality of transmitting beams. In other words, the third device 130 may transmit the plurality of reference signals with transmitting beam sweeping. In some embodiments, the reference signal may be CSI-RS. Alternatively or in addition, the reference signal may be CSI-SS.

At block 630, the third device 130 receives the identity information of the selected transmitting beam of the third device 130 from the first device 110-1 or the second device 120. The identity information may also comprise a corresponding beam quality (for example, reference signal received power RSRP). The identity information may be transmitted with uplink reference signal. For example, the identity information may be transmitted in PUCCH. Alternatively or in addition, the identity information may be transmitted in PUSCH. The second device 120 may transmit the identity information of the selected transmitting beam of the third device 130 to the third device 130 via the backhaul.

In some embodiments, if the first device 110-1 transmit more than one beam pair, for example a first beam pair and a second beam pair, the second device 120 may determine 3055 a target beam pair from the more than one beam pair. The third device 130 may receive the indication of the target beam pair selected from the first and second beam pairs from the second device 120 or a core network device.

In some embodiments, an apparatus for performing the method 400 (for example, the first device 110-1) may comprise respective means for performing the corresponding steps in the method 400. These means may be implemented in any suitable manners. For example, it can be implemented by circuitry or software modules.

In some embodiments, the apparatus comprises: means for receiving, at a first device and from a second device, information indicating a beam selection type for the second device and a third device, the beam selection type associated with communication quality required for the second device and the third device; means for receiving a plurality of reference signals from a plurality of transmitting beams of the third device based on the beam selection type; means for performing a beam measurement at least in part based on the plurality of reference signals; mans for selecting a transmitting beam of the third device based on the beam measurement; and means for transmitting identity information to at least one of the second and third devices, the identify information at least indicating the selected transmitting beam.

In some embodiments, the beam selection type indicates a required latency is below a threshold latency, and the means for performing the beam measurement comprises: means for measuring beam quality of the plurality of transmitting beams with a receiving beam of the first device.

In some embodiments, the beam selection type indicates a required performance exceeds a threshold performance, the means for receiving the plurality of reference signals comprises means for receiving the plurality of reference signals from a plurality of transmitting beams of the third deice, the means for performing the beam measurement comprises means for measuring beam quality of the plurality of transmitting beams of the third device with a plurality of receiving beams of the first device.

In some embodiments, the apparatus further comprises means for receiving a further plurality of reference signals from a plurality of transmitting beams of the second device, and the means for performing the beam measurement further comprises means for measuring beam quality of the further plurality of transmitting beams of the second device with the plurality of receiving beams.

In some embodiments, the apparatus further comprises means for selecting a further transmitting beam of the second device based on the beam measurement; and means for transmitting the identity information indicating the selected transmitting beam and the further transmitting beam to at least one of the second and third device.

In some embodiments, the means for selecting the transmitting beam of the third device comprises: means for selecting one of the plurality of transmitting beam with a quality exceeding a predetermined threshold as the transmitting beam; means for comparing beam quality of the plurality of transmitting beams with a threshold quality; and means for in accordance with a determination that the beam quality of the transmitting beam exceeds the threshold quality, selecting the transmitting beam.

In some embodiments, the first device is a terminal device, the second device is a network device and the third device is a further network device.

In embodiments, an apparatus for performing the method 500 (for example, the second device 120) may comprise respective means for performing the corresponding steps in the method 500. These means may be implemented in any suitable manners. For example, it can be implemented by circuitry or software modules.

In some embodiments, the apparatus comprises: means for determining, at a second device, a beam selection type for the second device and a third device based on communication quality required for the second device and the third device; means for transmitting information of the beam selection type to a first device; means for transmitting indication of selection of transmitting beam to the third device; and means for receiving, from the first device or the third device, identity information at least indicating a selected transmitting beam of the third device.

In some embodiments, the apparatus further comprises: means for in accordance with a determination that the identity information is received from the first device, transmitting the identity information to the third device via a backhaul.

In some embodiments, the beam selection type indicates a required performance exceeds a threshold performance and the apparatus further comprises: means for transmitting a plurality of reference signals with a plurality of transmitting beams.

In some embodiments, the apparatus further comprises means for obtaining a first beam pair and a second beam pair from the identity information, the first beam pair comprising a first transmitting beam of the second device, a first transmitting beam of the third device and a first receiving beam of the first device, the second beam pair comprising a second transmitting beam of the second device, a second transmitting beam of the third device and a second receiving beam of the first device; means for selecting a target beam pair from the first and second beam pairs; and means for transmitting an indication of the target beam pair to the third device.

In some embodiments, the apparatus further comprises means for transmitting the identity information to a core network device, the identity information indicating a first beam pair and a second beam pair, the first beam pair comprising a first transmitting beam of the second device, a first transmitting beam of the third device and a first receiving beam of the first device, the second beam pair comprising a second transmitting beam of the second device, a second transmitting beam of the third device and a second receiving beam of the first device; and means for receiving an indication of a target beam pair selected from the first and second beam pairs.

In some embodiments, the first device is a terminal device, the second device is a network device and the third device is a further network device.

In embodiments, an apparatus for performing the method 600 (for example, the third device 130) may comprise respective means for performing the corresponding steps in the method 600. These means may be implemented in any suitable manners. For example, it can be implemented by circuitry or software modules.

In some embodiments, the apparatus comprises means for receiving, at a third device and from a second device, indication of selection of transmitting beam; means for transmitting a plurality of signals with a plurality of transmitting beams; and means for receiving, from the first device or the second device, identity information at least indicating a selected transmitting beam of the third device.

In some embodiments, the apparatus further comprises means for in accordance with a determination that the identity information is received from the first device, transmitting, to the second device, the identity information of the selected transmitting beam of the third device via a backhaul.

In some embodiments, the identity information indicating a first beam pair and a second beam pair, the first beam pair comprising a first transmitting beam of the second device, a first transmitting beam of the third device and a first receiving beam of the first device, the second beam pair comprising a second transmitting beam of the second device, a second transmitting beam of the third device and a second receiving beam of the first device, the apparatus further comprises means for receiving an indication of a target beam pair selected from the first and second beam pairs from the second device or a core network device.

In some embodiments, the first device is a terminal device, the second device is a network device and the third device is a further network device.

Figure 7:
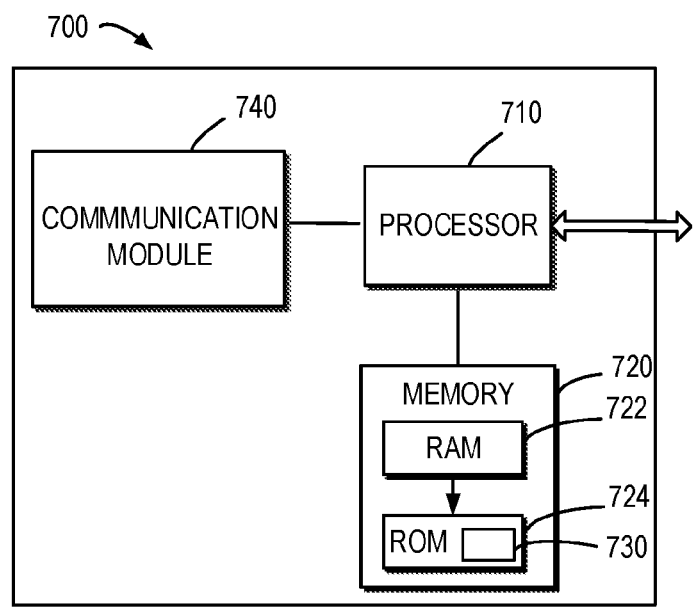
FIG. 7 illustrates a simplified block diagram of an apparatus that is suitable for implementing embodiments of the present disclosure.

FIG. 7 is a simplified block diagram of a device 700 that is suitable for implementing embodiments of the present disclosure. The device 700 may be provided to implement the communication device, for example the first device 110, the second device 120, or the third device 130 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 720 so that the device 700 may perform any process of the disclosure as discussed with reference to FIGS. 2 and 6. The embodiments of the present disclosure may also be implemented by hardware or by a combination of software and hardware.

Figure 8:
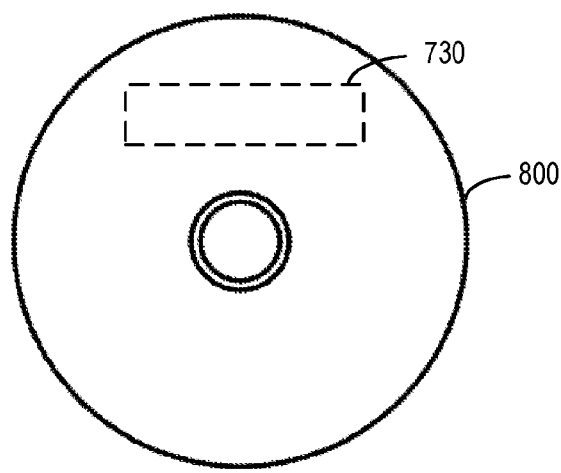
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labor between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 700 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 700 may be instead comprised in the distributed unit, and at least some of the described processes may be performed by the distributed unit.

In an embodiment, the execution of at least some of the functionalities of the device 700 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 700 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400-600 as described above with reference to FIGS. 4-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program codes;

the at least one memory and the computer program codes are configured to, with the at least one processor, cause the first device to:

receive, from a second device, information indicating a beam selection type for the second device and a third device, the beam selection type associated with communication quality required for the second device and the third device;

receive a plurality of reference signals from a plurality of transmitting beams of the third device based on the beam selection type;

perform a beam measurement at least in part based on the plurality of reference signals;

select a transmitting beam of the third device based on the beam measurement; and transmit identity information to at least one of the second and third devices, the identity information at least indicating the selected transmitting beam.

2. The first device of claim 1, wherein the beam selection type indicates a required latency is below a threshold latency, and wherein the first device is caused to perform the beam measurement by:

measuring beam quality of the plurality of transmitting beams with a receiving beam of the first device.

3. The first device of claim 1, wherein the beam selection type indicates a required performance exceeds a threshold performance, wherein the first device is caused to receive the plurality of reference signals by receiving the plurality of reference signals from a plurality of transmitting beams of the third device, and wherein the first device is caused to perform the beam measurement by measuring beam quality of the plurality of transmitting beams of the third device with a plurality of receiving beams of the first device.

4. The first device of claim 3, wherein the first device is further caused to:

receive a further plurality of reference signals from a plurality of transmitting beams of the second device, and wherein the first device is further caused to perform the beam measurement further by measuring beam quality of the further plurality of transmitting beams of the second device with the plurality of receiving beams.

5. The first device of claim 4, wherein the first device is further caused to:

select a further transmitting beam of the second device based on the beam measurement; and transmit the identity information indicating the selected transmitting beam and the further transmitting beam to at least one of the second and third device.

6. The first device of claim 1, wherein the first device is further caused to select the transmitting beam of the third device by:

selecting one of the plurality of transmitting beam with a quality exceeding a predetermined threshold as the transmitting beam;

comparing beam quality of the plurality of transmitting beams with a threshold quality; and in accordance with a determination that the beam quality of the transmitting beam exceeds the threshold quality, selecting the transmitting beam.

7. The first device of claim 1, wherein the first device is a terminal device, the second device is a network device and the third device is a further network device.

8. A second device comprising:
at least one processor; and
at least one memory including computer program codes;
the at least one memory and the computer program codes are configured to, with the at least one processor, cause the second device to:

determine a beam selection type for the second device and a third device based on communication quality required for the second device and the third device;

transmit information of the beam selection type to a first device;

transmit indication of selection of transmitting beam to the third device; and receive, from the first device or the third device, identity information at least indicating a selected transmitting beam of the third device, wherein the second device is further caused to, in accordance with a determination that the identity information is received from the first device, transmit the identity information to the third device via a backhaul.

9. The second device of claim 8, wherein the beam selection type indicates a required performance exceeds a threshold performance and the second device is further caused to:

transmit a plurality of reference signals with a plurality of transmitting beams.

10. The second device of claim 9, wherein the second device is further caused to:

obtain a first beam pair and a second beam pair from the identity information, the first beam pair comprising a first transmitting beam of the second device, a first transmitting beam of the third device and a first receiving beam of the first device, the second beam pair comprising a second transmitting beam of the second device, a second transmitting beam of the third device and a second receiving beam of the first device;

select a target beam pair from the first and second beam pairs; and transmit an indication of the target beam pair to the third device.

11. The second device of claim 9, wherein the second device is further caused to:

transmit the identity information to a core network device, the identity information indicating a first beam pair and a second beam pair, the first beam pair comprising a first transmitting beam of the second device, a first transmitting beam of the third device and a first receiving beam of the first device, the second beam pair comprising a second transmitting beam of the second device, a second transmitting beam of the third device and a second receiving beam of the first device; and receive an indication of a target beam pair selected from the first and second beam pairs.

12. The second device of claim 8, wherein the first device is a terminal device, the second device is a network device and the third device is a further network device.

13. A third device comprising:
at least one processor; and
at least one memory including computer program codes;
the at least one memory and the computer program codes are being configured to, with the at least one processor, cause the third device to:

receive, from a second device, indication of selection of transmitting beam;

transmit a plurality of signals with a plurality of transmitting beams; and receive, from a first device or the second device, identity information at least indicating a selected transmitting beam of the third device, wherein the third device is further caused to, in accordance with a determination that the identity information is received from the first device, transmit, to the second device, the identity information of the selected transmitting beam of the third device via a backhaul.

14. The third device of claim 13, wherein the identity information indicating a first beam pair and a second beam pair, the first beam pair comprising a first transmitting beam of the second device, a first transmitting beam of the third device and a first receiving beam of the first device, the second beam pair comprising a second transmitting beam of the second device, a second transmitting beam of the third device and a second receiving beam of the first device, wherein the third device is further caused to:
  receive an indication of a target beam pair selected from the first and second beam pairs from the second device or a core network device.

15. The third device of claim 13, wherein the first device is a terminal device, the second device is a network device and the third device is a further network device.

* * * * *